United States Patent
Vanne et al.

(10) Patent No.: US 11,375,333 B1
(45) Date of Patent: Jun. 28, 2022

(54) SPATIAL AUDIO REPRODUCTION BASED ON HEAD-TO-TORSO ORIENTATION

(71) Applicant: Apple Inc., Cupertino, CA (US)

(72) Inventors: Antti J. Vanne, Los Gatos, CA (US);
Darius A. Satongar, Santa Clara, CA (US); James W. Vandyke, San Francisco, CA (US); Juha O. Merimaa, San Mateo, CA (US); Martin E. Johnson, Los Gatos, CA (US); Tomi A. Huttunen, Kuopio (FI)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/023,160

(22) Filed: Sep. 16, 2020

Related U.S. Application Data (60) Provisional application No. 62/903,430, filed on Sep. 20, 2019.

(51) Int. Cl.
*H04S 7/00* (2006.01)
*G06F 3/01* (2006.01)
(Continued)

(52) U.S. Cl.
CPC .............. *H04S 7/304* (2013.01); *G06F 3/012* (2013.01); *G06F 3/017* (2013.01); *H04R 5/033* (2013.01); *H04R 5/04* (2013.01); *H04S 2420/01* (2013.01)

(58) Field of Classification Search
None
See application file for complete search history.

(56) References Cited

U.S. PATENT DOCUMENTS

2016/0119731 A1* 4/2016 Lester, III ................ H04S 7/40
  381/59
2016/0269849 A1* 9/2016 Riggs ...................... H04S 7/301
(Continued)

FOREIGN PATENT DOCUMENTS

WO 2017051079 A1 3/2017
WO 2018084770 A1 5/2018

OTHER PUBLICATIONS

Ramani Duraiswami, et al.; Higher Order Spatial Audio Capture and its Binaural Head-Tracked Playback Over Headphones with HRTF Cues; Audio Engineering Society (AES) 119th Convention, New York, NY, USA; dated Oct. 7-10, 2005; 16 pp.
(Continued)

*Primary Examiner* — Qin Zhu
(74) *Attorney, Agent, or Firm* — Womble Bond Dickinson (US) LLP (57) ABSTRACT

A media system and a method of using the media system to reproduce spatial audio based on head-to-torso orientation, are described. The method includes determining a head-to-source orientation and a head-to-torso orientation based on head orientation data generated by a head tracking device. Determining the head-to-torso orientation includes determining torso movements based on movements of the head. The torso can be determined to move when the head movements meet a head movement condition, such as a predetermined angle of movement or pattern of movement. A binaural audio filter that is based on a head-related transfer function corresponding to both the head-to-source orientation and the head-to-torso orientation is applied to an audio input signal to generate an audio output signal. The audio output signal is played to accurately recreate spatial audio having sounds emitted to the user by a sound source. Other aspects are also described and claimed.

23 Claims, 6 Drawing Sheets

(51) Int. Cl.
  *H04R 5/033* (2006.01)
  *H04R 5/04* (2006.01)

(56) References Cited

U.S. PATENT DOCUMENTS

2018/0220253 A1* 8/2018 Karkkainen ............ H04S 7/303
2020/0059749 A1* 2/2020 Casimiro Ericsson ......................
                                                       H04S 7/304

OTHER PUBLICATIONS

Fabian Brinkmann, et al.; Audility and Interpolation of Head-Above-Torso Orientation in Binaural Technology; IEEE Journal of Selected Topics in Signal Processing vol. 9 No. 5; dated Aug. 2015; 12 pp.

* cited by examiner

SPATIAL AUDIO REPRODUCTION BASED ON HEAD-TO-TORSO ORIENTATION

This application claims the benefit of priority of U.S. Provisional Patent Application No. 62/903,430, filed Sep. 20, 2019, and incorporates herein by reference that provisional patent application.

BACKGROUND

Field

Aspects related to audio systems are disclosed. More particularly, aspects related to audio systems used to render spatial audio are disclosed.

Background Information

Spatial audio can be played using headphones that are worn by a user. For example, the headphones can reproduce a spatial audio signal communicated by a device to simulate a soundscape around the user. An effective spatial sound reproduction can recreate sounds such that the user perceives the sound as coming from a location within the soundscape external to the user's head, just as the user would experience the sound if encountered in the real world.

When a sound travels to a listener from a surrounding environment in the real world, the sound propagates along a direct path, e.g., through air to the listener's ear canal entrance, and along one or more indirect paths, e.g., by reflecting and diffracting around the listener's head or shoulders. As the sound travels along the indirect paths, artifacts can be introduced into the acoustic signal that the ear canal entrance receives. User-specific artifacts can be incorporated into binaural audio by signal processing algorithms that use spatial audio filters. For example, a head-related transfer function (HRTF) describes how a sound located somewhere in space, relative to a listener's body, is filtered, e.g., reflected or diffracted around the listener's head, torso, and outer ear, before entering their auditory system. The HRTF-described cues allow the auditory system to determine where in space a sound is coming from.

To implement accurate spatial audio reproduction, a virtual audio system can use the HRTF to create the illusion that sound is coming from somewhere in space. More particularly, an HRTF-related audio filter can be applied to an audio input signal to shape the signal in such a way that reproduction of the shaped signal realistically simulates a sound traveling to the user from the relative location at which the HRTF was measured. Accordingly, a listener can use simple stereo headphones to create the illusion of a sound source somewhere in a listening environment by applying the binaural audio filter to the audio input signal.

SUMMARY

Existing virtual audio rendering systems are required to know the user's head orientation relative to the virtual sound source in order to select an appropriate head-related transfer function (HRTF). Typically, the HRTF is defined and measured as having a dependence on an azimuth angle, elevation angle, and sometimes a distance between the virtual sound source and the user's head. Definitions of the HRTF dataset up until now do not encapsulate the dimension related to the orientation of the rest of the body relative to the user's head. More particularly, changes away from a nominal forward-facing head-to-torso orientation are not accounted for when using a HRTF dataset; the torso is assumed to rotate and move with the head. Thus, a user that turns his head to the right while keeping his torso stationary, e.g., facing forward, will have the unsettling experience of hearing sound as though he turned his torso to the right concurrently with his head. In other words, the virtual audio rendering systems do not differentiate between cases when the head and torso are moved separately and cases when the head and torso are moved together. This disregard for head-to-torso orientations by existing virtual audio rendering systems results in spatial audio renderings that do not accurately reproduce the effects that the torso orientation has on sound sources in real life.

A media system and a method of using the media system to accurately reproduce virtual audio taking into account a user's head orientation relative to the user's torso, are described. In an embodiment, the media system includes one or more processors configured to determine a head-to-source orientation and a head-to-torso orientation. The head-to-source orientation can be a relative position and/or orientation between a head of a user and a sound source. The relative orientation can be determined from head tracking data generated by a head tracking device, such as a head mounted device having inertial measurement units. The head-to-torso orientation can be a relative position and/or orientation between the head of the user and a torso of the user. The relative orientation can be directly measured, e.g., by one or more sensors of the head tracking device or a companion device. Alternatively, the relative orientation can be inferred based only on the head tracking data generated by the head tracking device.

Estimation of the head-to-torso orientation based on the head tracking data can include determining that the torso moves toward alignment with the head when the head orientation data meets a head movement condition. For example, the torso may move when the head moves. Alternatively, the torso may move when the head has moved and then stopped moving at a new orientation. In an aspect, the torso may move when the head moves in a particular pattern. In any case, the movement of the torso can be related to the head movement, e.g., numerically through an average or median of head tracking data, or in some other manner, e.g., by moving the torso according to a particular pattern that corresponds to the pattern detected for the head movement.

Inference of the head-to-torso orientation can also be based on contextual data that exists at the time of the head movement. For example, the inference may be based on a current state of the user, e.g., whether the user is ambulatory, or a current use of the head tracking device, e.g., whether the system is being used to reproduce a soundscape of a movie. In any case, the contextual information can provide additional information to control whether or how the estimation of torso movement is made.

Based on the head-to-source orientation and the head-to-torso orientation (whether measured or inferred), the media system can select an appropriate head-related transfer function (HRTF) to realistically render spatial audio. The HRTF may be numerically simulated to represent a particular pose of the user that is being rendered. An audio filter based on the HRTF can be applied to an audio input signal to generate an audio output signal. When played by the media system, the audio output signal can recreate spatial audio that accounts for the particular pose of the user and accurately reproduce real life.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Aspects describe a media system and a method of using the media system to reproduce spatial audio based on a head-to-torso orientation of a user. The media system can include one or more of a mobile device or a head mounted device. For example, the media system can include a pair of headphones having one or more processors to determine the head-to-torso orientation based on head orientation data. In an aspect, the mobile device can be a smartphone and the head mounted device can be circumaural headphones. The mobile device, however, can be another device for rendering or playing audio to the user, such as a desktop computer, a laptop computer, etc., and the head mounted device can include other types of headphones, such as earbuds or a headset, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "rightward" may indicate a first direction away from a reference point. Similarly, "leftward" may indicate a location in a second direction away from the reference point and opposite to the first direction. Such terms are provided to establish relative frames of reference, however, and are not intended to limit the use or orientation of a media system to a specific configuration described in the various aspects below.

In an aspect, a media system is used to reproduce spatial audio based on head-to-torso orientation of a user. The head-to-torso orientation can be determined by measuring the head and torso orientation directly, or alternatively, the head-to-torso orientation can be determined based on head orientation data alone. For example, the media system can include a head tracking device to generate head orientation data for the head of the user, and torso orientation data for the torso of the user can be estimated or inferred from the head orientation data. The head-to-torso orientation data can be used to select an appropriate head-related transfer function (HRTF) that corresponds to the head-to-torso orientation, and a binaural audio filter based on the HRTF can be applied to an audio input signal to generate an audio output signal for playback to the user. The reproduced audio output signal can accurately recreate a spatial audio experience by accounting for head-to-source orientation and head-to-torso orientation.

Figure 1:
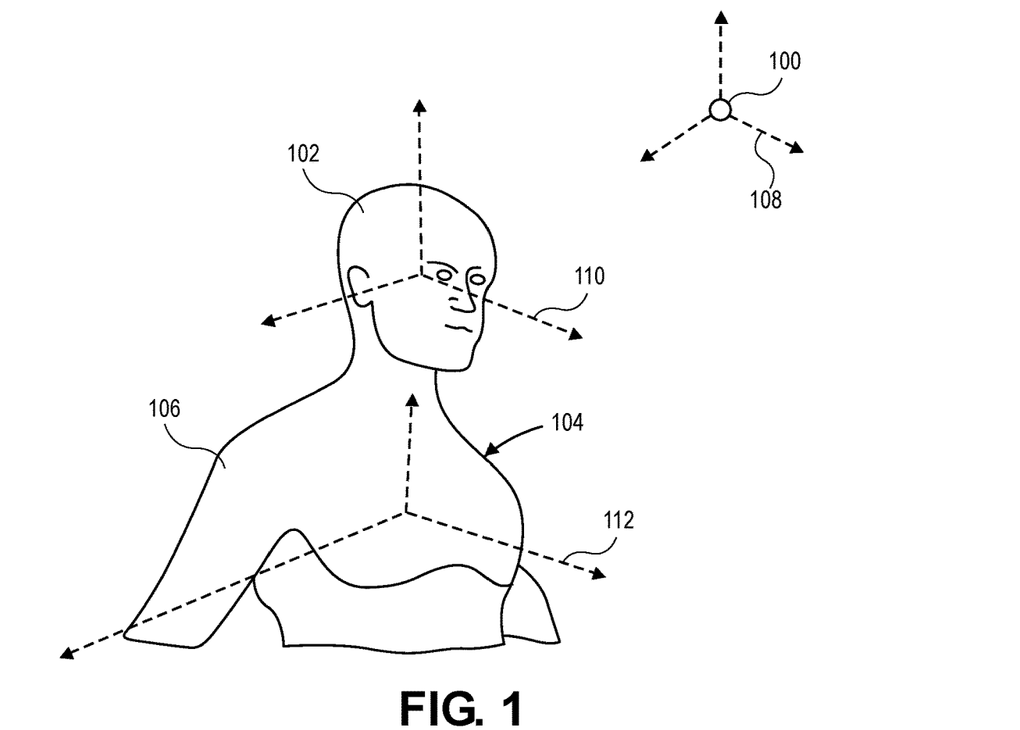
FIG. 1 is a pictorial view of a user positioned relative to a sound source in a soundscape, in accordance with an embodiment.

Referring to FIG. 1, a pictorial view of a user positioned relative to a sound source in a soundscape is shown in accordance with an embodiment. A media system can provide an accurate spatial audio experience by accounting for both head-to-source orientation and head-to-torso orientation. More particularly, the media system can apply binaural audio filters based on HRTFs that account for relative orientation between a sound source 100 and a head 102 of a user 104, as well as a relative orientation between head 102 and a torso 106 of the user 104.

Each of sound source 100, head 102, and torso 106 can have respective orthogonal axes that provide respective frames of reference. In an embodiment, source axes 108 of sound source 100 defines an absolute frame of reference within a soundscape. More particularly, sound source 100 may have a point location within the soundscape, and thus, relative positions and movements of head 102 and torso 106 may be determined relative to the point location. Accordingly, head axes 110 of head 102 can be aligned with source axes 108, as shown, or misaligned when the user moves his head from the illustrated position. Similarly, torso axes 112 of torso 106 can be aligned with source axes 108 and head axes 110, as shown, or misaligned when the user moves his torso from the illustrated position.

It will be appreciated that the frame of reference for determining relative positions and movements between the head 102 and torso 106 may be calculated within a separate, inertial reference frame. More particularly, the virtual sound source 100 may move, and thus, it may be more convenient or practical to determine relative positions of the sound source 100, head 102, and torso 106 relative to an independent reference datum. Such translations between alternate frames of reference and the source frame are considered to be within the scope of this description. For example, when the positions and orientations of sound source 100, head 102, and torso 106 are known relative to the independent reference datum, which may be arbitrarily set within the soundscape, the relative positions and orientations between two or more of the sound source 100, head 102, and torso 106 can be calculated.

Each of the orthogonal axes can be further defined based on axial subcomponents. A vertical axis of each group of axes may be termed an azimuth axis because the respective object can rotate about the azimuth axis when subtending a yaw angle, e.g., user 104 can turn head 102 rightward through the yaw angle to view something to the side. A laterally-directed axis of each group of axes may be termed an elevation axis because the respective object can rotate about the elevation axis when subtending a pitch angle, e.g., user 104 can tilt head 102 upward through the pitch angle to view something above. A forward-directed axis of each group of axes may be termed a roll axis because the respective object can rotate about the roll axis when subtending a roll angle, e.g., user 104 can crane head 102 sideways to listen to something above him. To accurately account for the relative orientation between sound source 100 and both head 102 and torso 106, an HRTF can be associated with an angular differential between source axes 108 and head axes 110, a distance from an origin of source axes 108 to an origin of head axes 110, an angular differential between head axes 110 and torso axes 112, and a distance between the origin of head axes 110 and an origin of torso axes 112. Similarly, an HRTF can be associated with other relative distances/orientations, such as an angular differential between source axes 108 and head axes 110, a distance from the origin of source axes 108 to the origin of head axes 110, an angular differential between source axes 108 and torso axes 112, and a distance between the origin of source axes 108 and the origin of torso axes 112. In any case, an HRTF that fully describes the relative position and orientation between sound source 100, head 102, and torso 106 in the soundscape can be used to accurately render spatial audio.

Figure 2:
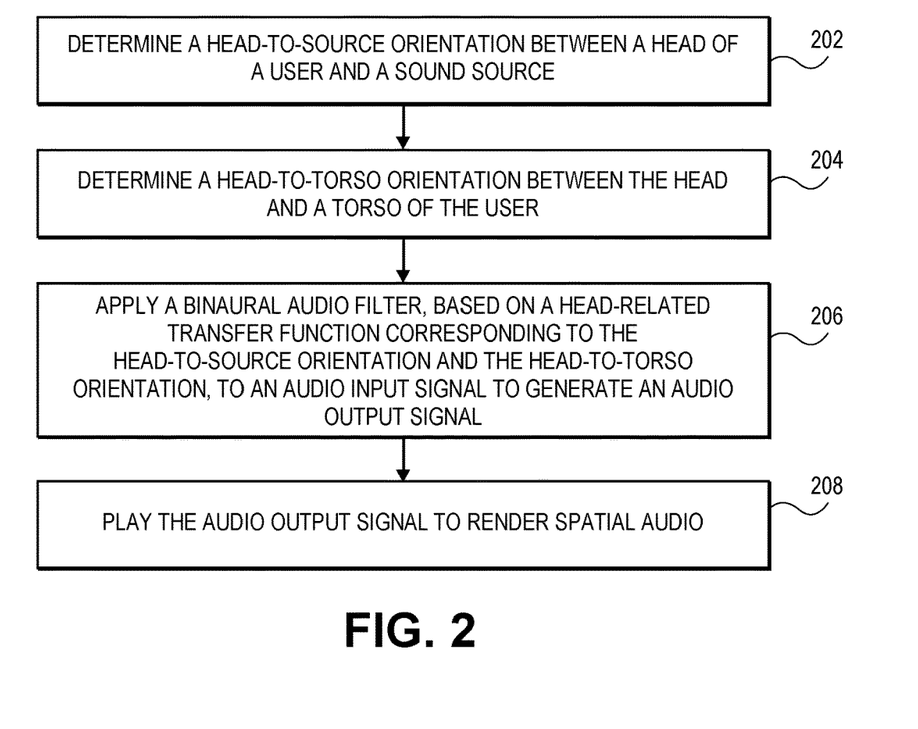
FIG. 2 is a flowchart of a method of reproducing spatial audio based on a head-to-torso orientation, in accordance with an embodiment.

Referring to FIG. 2, a flowchart of a method of reproducing spatial audio based on a head-to-torso orientation is shown in accordance with an embodiment. The flowchart of FIG. 2 is described in detail with respect to the remaining figures, including with respect to the illustrated flowchart of FIG. 3. Accordingly, the operations of FIG. 2 are referenced integrally with the descriptions of FIGS. 3-10 below.

Figure 3:
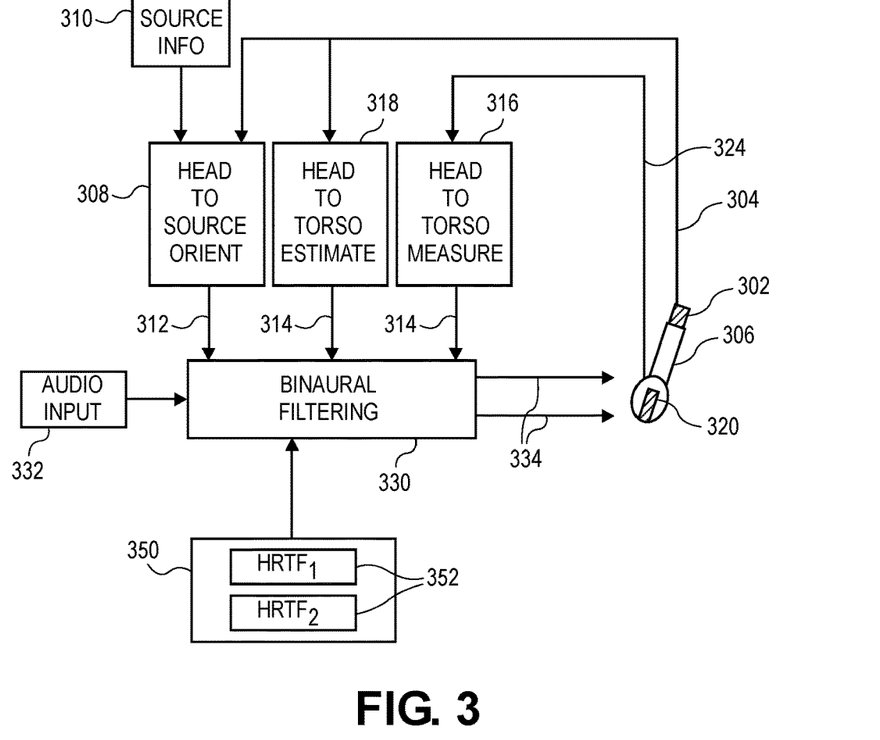
FIG. 3 is a schematic view of a method of reproducing spatial audio based on a head-to-torso orientation, in accordance with an embodiment.

Referring to FIG. 3, a schematic view of a method of reproducing spatial audio based on a head-to-torso orientation is shown in accordance with an embodiment. At operation 202, a head-to-source orientation between head 102 of user 104 and sound source 100 are determined. As described below, a media system used to render spatial audio can include a head tracking device 302 to generate head orientation data 304. For example, head tracking device 302 can be a portion of a head mounted device 306 having one or more sensors to generate data representing the spatial orientation of head tracking device 302 in space. In an embodiment, head mounted device 306 is an audio capable device worn on head 102 of user 104, such as a pair of headphones. The headphones can contain one or more accelerometers used to detect or measure a direction of gravity, e.g., relative to the user's head 102. Accordingly, the gravity vector can be used to determine a head orientation within space, assuming that user 104 is wearing the headphones in an expected manner, e.g., with the ear cups over the user's ear and the headband over a top of head 102.

Sound source 100 may be assumed to have source axes 108 arranged in a particular manner with respect to the space. For example, the azimuth axis of source axes 108 may be assumed to be vertical, e.g., aligned with the gravity vector detected by accelerometer(s) of head tracking device 302. Given that the position and orientation of sound source 100 within space is known via the spatial audio simulation, and the orientation of head 102 within space is known from head orientation data 304, the relative position and orientation between head 102 and sound source 100 may be calculated. More particularly, at block 308, one or more processors of the media system can receive source locations 310 describing the position and orientation of sound source 100 in the space, and head orientation data 304 describing the orientation of head 102 within space. The processor(s) can calculate a head-to-source orientation 312 between head 102 and sound source 100 based on the received data. Head-to-source orientation data can include a relative yaw, pitch, or roll angle between source axes 108 and head axes 110. Furthermore, head-to-source orientation 312 data can include a distance between the origin of source axes 108 and the origin of head axes 110. Thus, head-to-source orientation data can fully describe the relative position and orientation between sound source 100 and head 102 within the soundscape.

At operation 204, a head-to-torso orientation 314 between head 102 and torso 106 of user 104 can be determined. It will be appreciated that the media system can determine head-to-torso orientation 314 based on direct measurements of the relative position and orientation between head 102 and torso 106 (at block 316), or by estimates of the relative position and orientation between head 102 and torso 106 made based on head orientation data 304 received from head tracking device 302 (at block 318). Each of these embodiments is described below, beginning with the estimation of head-to-torso orientation 314 from head tracking data alone. Head-to-torso orientation data can include a relative yaw, pitch, or roll angle between head axes 110 and torso axes 112. Furthermore, head-to-torso orientation data can include a distance, e.g., a three-dimensional vector having an x-, y-, and z-component, between an origin of head axes 110 and origin of torso axes 112. The angular data can provide a relative orientation and the distance data can provide a relative position between the axes. Thus, head-to-torso orientation data can fully describe the relative position and orientation between head 102 and torso 106 within the soundscape.

Figure 4:
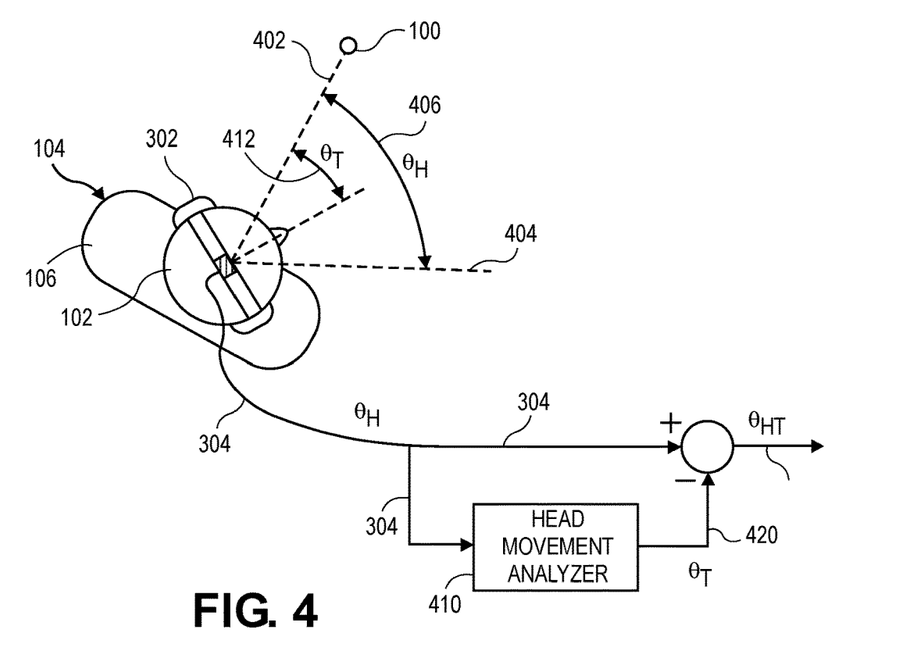
FIG. 4 is a pictorial view of a head of a user moving relative to a sound source in a soundscape, in accordance with an embodiment.

Referring to FIG. 4, a pictorial view of a head of a user moving relative to a sound source in a soundscape is shown in accordance with an embodiment. Unlike existing virtual audio rendering systems, which assume that head 102 is locked to torso 106, i.e., head axes 110 and torso axes 112 remain aligned whenever head 102 moves, the media system can, at block 318, make predictions about the relative position and orientation between head 102 and torso 106 (which may include misaligned axes) based only on head orientation data 304. More particularly, the media system can infer the torso orientation based on expected behavior or expected movements of torso 106 that accompany head movements.

In an embodiment, user 104 moves head 102 relative to sound source 100. For brevity and ease of understanding, the example illustrated in FIG. 4 shows relative movement by an angle about the azimuth axis of head axes 110, i.e., through a yaw angle. It will be appreciated that relative movements may also be through a pitch angle or a roll angle.

As user 104 moves head 102, e.g., turning rightward, from an initial orientation 402 toward a final orientation 404, head 102 subtends the head-to-source yaw angle 406. Head-to-source yaw angle 406 is defined by head orientation data 304 generated by head tracking device 302. More particularly, head orientation data 304 can define an angle between a roll axis of head 102 and a roll axis of sound source 100 (which are illustrated as being initially aligned), and thus, head orientation data 304 can define a yaw angle between head 102 and sound source 100. Head orientation data 304 can be input to a head movement analyzer block 410. Head movement analyzer can include one or more algorithms implemented by one or more processors of the media system to estimate a relative orientation between torso 106 and sound source 100. For example, head movement analyzer 410 can infer a torso-to-source yaw angle 412 between torso 106 and sound source 100 based on head orientation data 304.

Torso-to-source yaw angle 412 can define an estimated angle between a roll axis of torso 106 and a roll axis of sound source 100. The estimated angle may not precisely correspond to an actual relative orientation between torso 106 and sound source 100, as shown in FIG. 4, however, it may more accurately define the relative orientation as compared to not accounting for torso movement at all in existing systems. Certain examples of the algorithms that may be used to infer torso movement are described below, and generally, the estimates can be based on numerical methods implemented on head orientation data 304, numerical techniques implemented on head orientation data 304 that include conditional boundaries, or matching head orientation data 304 to learned data sets, to infer torso orientation data 420 from the measured head movements. In any case, head movement analyzer 410 can output the estimated torso orientation data 420 describing the expected movement of torso 106.

The media system can use head orientation data 304 and torso orientation data 420 to determine head-to-torso orientation 314. In an embodiment, head-to-torso orientation 314 is a differential between head orientation data 304 and torso orientation data 420. When the relative position and orientation between sound source 100 and both head 102 and torso 106 is known, the differential can relate the position and orientation of head 102 and torso 106 to each other. The sound source 100 effectively provides a reference point within the soundscape. For example, when both head 102 and torso 106 have a same relative position and orientation to sound source 100, the head-to-torso orientation 314 is zero. In such case, the head axes 110 and the torso axes 112 may be considered to be coincident or aligned.

The head-to-torso estimation block 318 may utilize algorithms that assume that the long term orientation of head 102 relative to torso 106 is zero. For example, people may tend to look forward relative to their shoulders, and thus, the head-to-torso estimation may infer that head-to-torso orientation 314 trends to zero over time. The estimation therefore allows for short term motions of head 102 to be interpreted as head above torso rotations. If head 102 is rotated for extended periods of time, however, then the media system will interpret the long term movements as whole body rotation by user 104 (torso 106 has rotated along with head 102). As described below, the torso movement estimation can be controlled by numerous factors, including time delays, angular thresholds, rates of movement, etc. Each of the torso movement estimations and the determinations of head-to-torso orientation 314 can include determining that torso 106 moves toward alignment with head 102 when head orientation meets a respective head movement condition.

Figure 5:
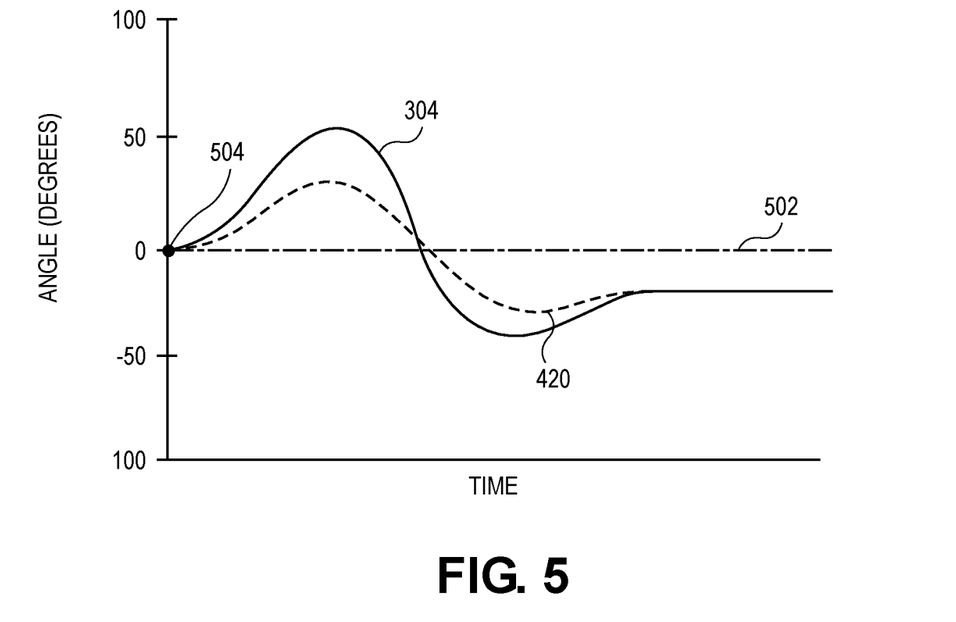
FIG. 5 is a graph of a head and torso orientation based on head orientation data over time, in accordance with an embodiment.

Referring to FIG. 5, a graph of a head and torso orientation based on head orientation data over time is shown in accordance with an embodiment. The graph can plot source orientation data 502, head orientation data 304, and torso orientation data 420, each as angle versus time information. By way of example, the angle may refer to as a yaw angle of each of sound source 100, head 102, and torso 106. Similar data may be generated, however, for a pitch angle, roll angle, or absolute position of each of the soundscape objects.

In an embodiment, torso orientation data 420 is estimated based on a numerical analysis of head orientation data 304. The numerical analysis can include determining that torso 106 moves toward alignment with head 102 when head orientation data 304 meets a head movement condition 504. Head movement condition 504 can be a movement of head 102 away from an initial position. For example, the torso orientation may have a value equal to a median or an average of head orientation over time. The numerical technique, e.g., averaging, may occur over a time window, such as a 20 second time window. Accordingly, the torso orientation can have a value equal to an average of head orientation data 304 sampled over a preceding 20 second time window. Similarly, the torso orientation can have a value equal to a median of head orientation data 304 sampled over a preceding 20 second time window. These timeframes are provided by way of example only.

The result of the numerical techniques described above is to have torso orientation that moves with head orientation whenever head 102 moves. Torso orientation, however, may lag behind head orientation. As illustrated, user 104 may turn head 102 in a first direction, e.g., rightward, from a zero-degree direction that is aligned to sound source 100. Subsequently, user 104 may turn head 102 in a second direction, e.g., leftward, crossing through the zero-degree direction. Head 102 may ultimately be turned to a direction that is between the leftmost direction and the zero-degree direction. Concurrently with head movement, the torso orientation can be inferred to move rightward and leftward lagging the head 102, and eventually, e.g., after the head 102 remains in a same direction for the time window period, the torso 106 may also be directed in the same direction. Essentially, the head tracking data and the inferred torso orientation data 420 describes head-to-torso orientation 314 that diverges from an initially aligned state and then converges to the aligned state again after the head stops moving.

Figure 6:
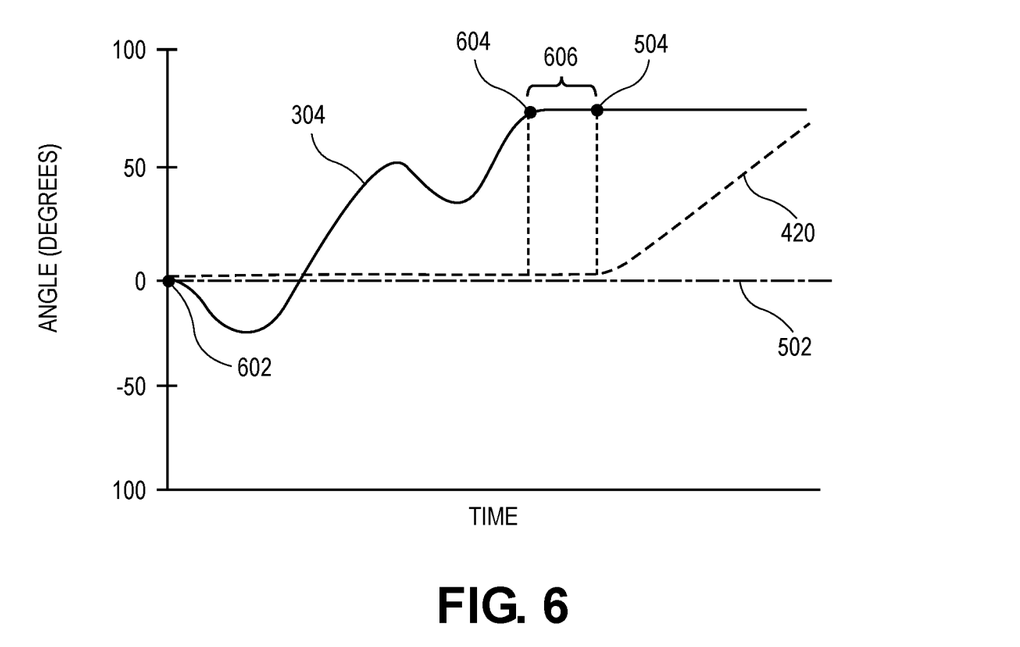
FIG. 6 is a graph of a head and torso orientation based on head orientation data over time, in accordance with an embodiment.

Referring to FIG. 6, a graph of a head and torso orientation based on head orientation data over time is shown in accordance with an embodiment. The graph can plot source orientation data 502, head orientation data 304, and torso orientation data 420, each as angle versus time information.

The estimation of torso orientation may include bounded numerical techniques to infer that torso 106 remains stationary unless a head movement condition 504 occurs in which head 102 has moved to and remained at an orientation for a predetermined length of time. More particularly, the numerical analysis can include determining that torso 106 moves toward alignment with head 102 when head orientation data 304 meets a head movement condition 504. Head movement condition 504 can include movement of head 102 from a first head orientation 602 to a second head orientation 604, and then resting head 102 at the second orientation for a predetermined period of time 606.

Head 102 can move from first head orientation 602 to second head orientation 604 by turning leftward and then rightward until the user 104 is facing a direction other than the zero-degree direction of sound source 100. During this movement, torso orientation may be estimated as remaining stationary and facing the zero-degree direction that head 102 initially faced. When head 102 arrives at second orientation from first orientation, head 102 may remain fixed or at rest within a degree of motion. More particularly, head 102 may not vary from second orientation by more than a predetermined angular tolerance. When head 102 remains at rest for the predetermined period of time 606, e.g., 30 seconds, head movement analyzer 410 can determine that user 104 is likely to have moved torso 106 toward head 102 so as to avoid maintaining a turned head 102 for an extended period of time. In response, torso orientation data 420 can indicate that torso 106 moves toward head 102 when head movement condition 504 occurs.

Torso orientation data 420 can indicate that torso 106 moves toward alignment with head 102 in a predetermined manner. As shown, a linear ramp rate may be used to transition torso 106 orientation from the zero-degree direction to the second orientation (the direction of second head orientation 604). The ramp rate may be chosen to gradually adjust acoustic effects from the turning torso 106 and avoid disturbingly abrupt changes. Other transition rates, such as non-linear and/or stepped change rates may also be used. Essentially, the head tracking data 304 and the inferred torso orientation data 420 describes head-to-torso orientation 314 that diverges from an initially aligned state and then converges to the aligned state again after the head stops moving.

Figure 7:
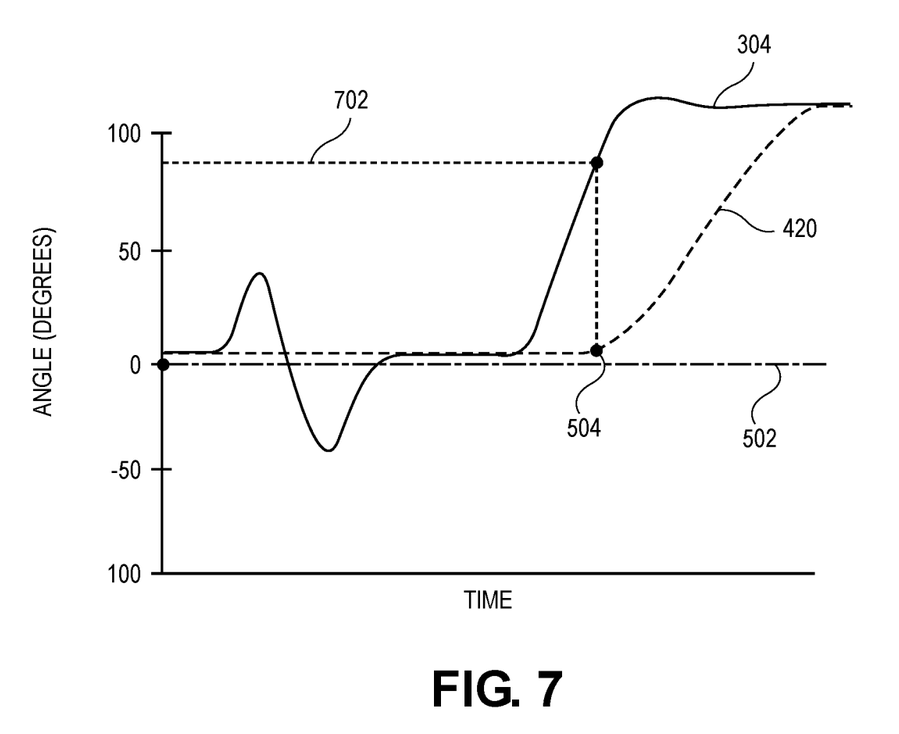
FIG. 7 is a graph of a head-to-torso orientation based on head orientation data over time, in accordance with an embodiment.

Referring to FIG. 7, a graph of a head-to-torso orientation based on head orientation data over time is shown in accordance with an embodiment. The graph can plot source orientation data 502, head orientation data 304, and torso orientation data 420, each as angle versus time information.

The estimation of torso orientation may include determining that torso 106 moves toward alignment with head 102 when head orientation data 304 meets a head movement condition 504. Head movement condition 504 can include movement of head 102 by a predetermined angle 702. For example, predetermined angle 702 can be a yaw angle through which head turns, although it will be appreciated that predetermined angle 702 may include one or more of a pitch angle (head 102 nodding upward or downward) or a roll angle (head 102 craning toward a right shoulder or a left shoulder). The estimation may assume that torso 106 remains stationary unless head 102 is turned by an amount that is unusual or impossible. By way of example, humans cannot turn their heads by more than 90 degrees relative to their torso 106, and thus, predetermined angle 702 to trigger torso movement in the torso orientation estimates may be 90 degrees.

Head 102 can move from the zero-degree direction aligned with sound source 100 leftward and rightward until the user is facing a direction other than the zero degree direction of sound source 100. When head 102 is turned by predetermined angle 702, head movement condition 504 occurs. Accordingly, torso orientation can be inferred to turn in the direction of head 102 to maintain a maximum angular differential, e.g., a head-to-torso orientation 314 of 90 degrees or less. When head 102 stops moving and rests at the new orientation in which head 102 faces the non-zero direction, torso 106 may continue to move toward alignment with head 102. For example, torso 106 can turn according to a linear ramp rate to transition torso 106 into alignment with head 102. Other transition profiles, such as non-linear and/or stepped transitions may be used. Essentially, the algorithm can assume that the long term estimate of head-to-torso orientation 314 is zero, and the head tracking data 304 and the inferred torso orientation data 420 describes head-to-torso orientation 314 that diverges from an initially aligned state and then converges to the aligned state again after the head stops moving.

It will be appreciated that the above-described algorithms for inferring torso orientation data 420 (and hence head-to-torso orientation 314) are intended as examples and shall not be considered to be restrictive. For example, although the examples are described with respect to changes in yaw angle, similar algorithms may be used to infer pitch angle and/or roll angles of torso axes 112 relative to head 102 or sound source 100. In such cases, different algorithms may be employed. For example, with respect to the numerical technique described with respect to FIG. 5, estimating torso orientation in the pitch direction may include averaging head movements over a longer period of time. The inference may be based on the assumption that user 104 is typically in an upright position, and thus, when head orientation data 304 indicates that head 102 is tilting backward, it is more likely that user 104 is looking at the ceiling rather than lying down on a bed. Accordingly, torso orientation may not begin to tilt backward unless head 102 is positioned in the backward tilted orientation for a relatively long period of time. Similarly, a predetermined period of time 606, as described with respect to FIG. 6, may be used to maintain torso orientation in an upright and stationary position unless head 102 is tilted backward for a relatively long period of time. Accordingly, the time constants, transition rates, etc., may differ based on whether an inference is being made about the yaw angle, pitch angle, roll angle, or position of torso 106.

The algorithms used by head movement analyzer 410 to infer torso orientation may be adapted to various conditions. More particularly, determining head-to-torso orientation 314 may be based on contextual information that is available to the media system. The contextual information can be about one or more of a current state of user 104 or a current use of head tracking device 302. Depending on the current state or the current use, the inference technique can be adjusted.

In an embodiment, the contextual information that drives the mode of inference indicates whether the user 104 is ambulatory. For example, accelerometer data from head tracking device 302 can detect that user 104 is standing or sitting upright, walking, running, or otherwise in an ambulatory position. Based on the contextual information, a head-to-torso orientation may be inferred to include head 102 relative to a vertically-oriented torso 106. For example, if the media system detects that user 104 is walking, then rotations of torso 106 are more likely to occur concurrently with rotations of head 102, e.g., torso 106 probably rotates simultaneously with head 102. Accordingly, torso orientation may be inferred to have a same orientation as head 102 orientation. This is the same as stating that torso orientation data 420 is equal to an average of head orientation data 304 taken over a single or relatively few samples (and therefore an adaptation of the technique described with respect to FIG. 5.)

The contextual information may indicate that head tracking device 302 is being used in a particular scenario. For example, head tracking device 302 may be used to play audio content of a movie to user 104. The contextual information may be provided by headphones or a mobile device that identifies the audio as a movie soundtrack. If the media system detects that user 104 is watching a movie, then the directions of head 102 and torso 106 may be locked to each other. For example, it may be assumed that someone is usually immobile while watching movies.

Accordingly, when head tracking device 302 or a companion device determines that user 104 is watching the movie, head-to-torso orientation 314 may be inferred to include head 102 aligned to torso 106. That is, head-to-torso orientation 314 may be zero in one or more of the yaw, pitch, or roll directions. This example is non-restrictive, however, because it may be that people usually sit to watch movies with their torso 106 still and their head 102 moving occasionally above their torso 106. Accordingly, when head tracking device 302 or a companion device determines that user 104 is watching the movie, head-to-torso orientation 314 may be inferred to include head 102 free to move relative to torso 106 in one or more directions, e.g., the yaw direction. The head-to-torso orientation 314 may be zero in one or more other directions, however, such as the pitch direction. It will be appreciated from the above that the particular head-to-torso orientation inferences can be drawn from contextual information describing predetermined scenarios that are associated with expected use patterns.

Other more simplistic or complex inferences may be made to determine head-to-torso orientation 314. For example, the media system can estimate torso orientation data 420 as remaining stationary regardless of an amount or a time that head 102 has moved out of alignment with torso 106. As described above, existing systems do not account at all for the likelihood that head 102 and torso 106 move separately from each other in most situations. Accordingly, the inference that head 102 is above torso 106 and only head 102 is moving (torso 106 remains stationary) can be an improvement over the state-of-the-art.

In an embodiment, the algorithms used to infer torso orientation may include machine learning algorithms that employ predictive analytics to determine head-to-torso orientation 314 based on head orientation data 304. In the context of the algorithms described above, the head movement condition 504 that triggers movement of torso 106 can include a match between the measured head movement and a pattern of head movement of one or more other users 104. Data sets that measure or infer head-to-torso movements of users in particular scenarios can be stored and mined to determine the patterns of head movement of a population. As a non-limiting example, measured head and/or torso orientation data sets can show that when users heads are bobbing up and down in the pattern of a runner's cadence, then the torso of the users will typically twist back and forth as the users pump their arms while running. Accordingly, when the media system identifies the bobbing motion in head orientation data 304 generated by head tracking device 302, torso orientation data 420 may be estimated as having the twisting motion to ensure that spatialized sound accurately reproduces the reflections that occur from the torso 106 while user 104 runs. Other examples that learn from patterns of movement of a group of people and use the learned information to infer the relative position between head 102 and torso 106 are contemplated as being within the scope of this description.

Referring again to FIG. 3, head-to-torso orientation 314 may be directly measured at block 316. The relative position or orientation between head 102 and torso 106 can be calculated based on a comparison between head orientation data 304 measured by head tracking device 302 and measured torso orientation data 324 measured by a torso tracker 320. A non-restrictive example follows.

Figure 8:
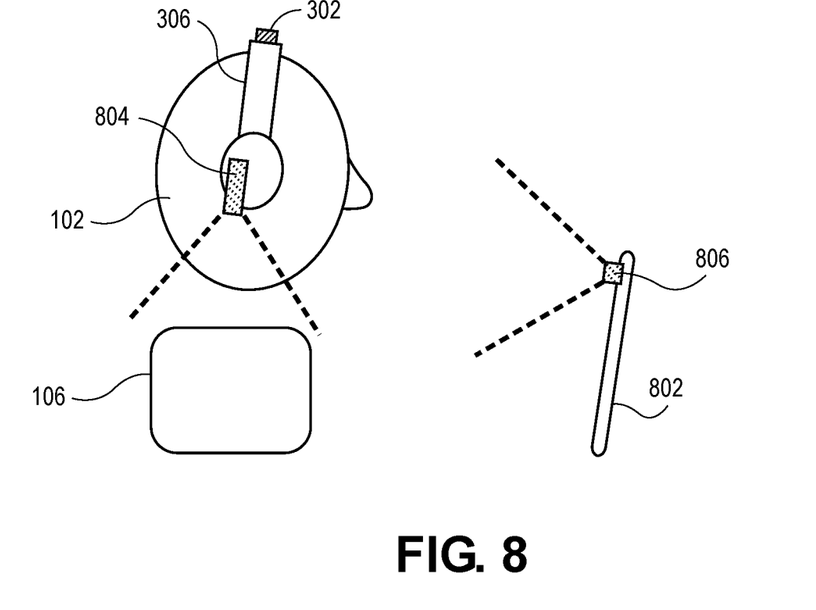
FIG. 8 is a pictorial view of various head-to-torso measurements for determining a head-to-torso orientation directly, in accordance with an embodiment.

Referring to FIG. 8, a pictorial view of various head-to-torso measurements for determining a head-to-torso orientation directly is shown in accordance with an embodiment. Head orientation data 304 can be captured in a manner similar to that described above. For example, head tracking device 302 can include a set of accelerometers used to detect a direction of gravity relative to head orientation. Head orientation data 304 therefore provides information about a relative position and orientation between head 102 and sound source 100

Torso orientation data 324 may be measured by one or more sensors of head mounted device 306 and/or a companion device, such as a mobile device 802. The sensor(s) can generate torso orientation data 324 that describes a position and/or orientation of torso 106 in space. In an embodiment, the sensor(s) include a downward looking camera 804. Downward looking camera 804 can identify and track a visual feature, e.g., a pattern of the user's clothing, to determine movement of head 102 relative to torso 106. Alternatively, the sensor can be a time of flight sensor or a depth sensor used to infer movement of head 102 relative to torso 106. Wearable sensors may also be used to detect torso orientation. For example, user 104 may wear accelerometers on torso 106, such as accelerometers embedded within mobile device 802, and thus, the accelerometers can detect movement of torso 106. In an embodiment, mobile device 802 includes a sensor such as a forward facing camera 806 to measure orientation of torso 106. Forward facing camera 806 can capture gross dimensions of torso 106, and thus, the dimensional data can be analyzed to infer movement of torso 106. Accordingly, numerous techniques exist to allow direct measurement of torso orientation. The one or more processors of the media system can receive the measured torso orientation data 420 and use the data to calculate head-to-torso orientation 314. Accordingly, estimated or measured head-to-torso orientation 314 can be used to drive selection of an appropriate HRTF for spatial audio reproduction.

Referring again to FIG. 3, the media system, at operation 206, applies a binaural audio filter, via binaural filtering at block 330, to an audio input signal 332 to generate an audio output signal 334 that accurately represents the soundscape. Audio input signal 332 can be associated with sound source 100. The audio input signal 332 can be a signal representing sound of a scene captured at the point location of the sound source 100 within the soundscape. For example, the audio input signal 332 may be captured by array(s) of microphones in free space within the soundscape, e.g., at or near the point location. The microphone array(s) record the sound of the scene, and the recording is represented by the audio input signal 332. The binaural audio filter applied at block 330 is based on an HRTF that corresponds to both head-to-source orientation 312 and head-to-torso orientation 314. Accordingly, the media system can re-create a high-quality virtual audio demonstration that accounts for the correct positioning of torso 106 using head-to-source and head-to-torso tracking.

Measuring HRTF sets for all possible relative positions and orientations between sound source 100, head 102, and torso 106 can be time-consuming. Accordingly, typical techniques of generating HRTFs in a laboratory may not be well-suited to establishing an HRTF data set that can support the method described above. More particularly, measuring HRTFs for every combination of head-to-body orientation and source-to-head orientation may be prohibitive. Therefore, in an embodiment, HRTFs for different head-to-source and head-to-torso orientations of user 104 may be numerically simulated. Numerical simulation of the HRTFs does not require user 104 to be measured for extensive periods of time, as is required in the laboratory setting.

Figure 9:
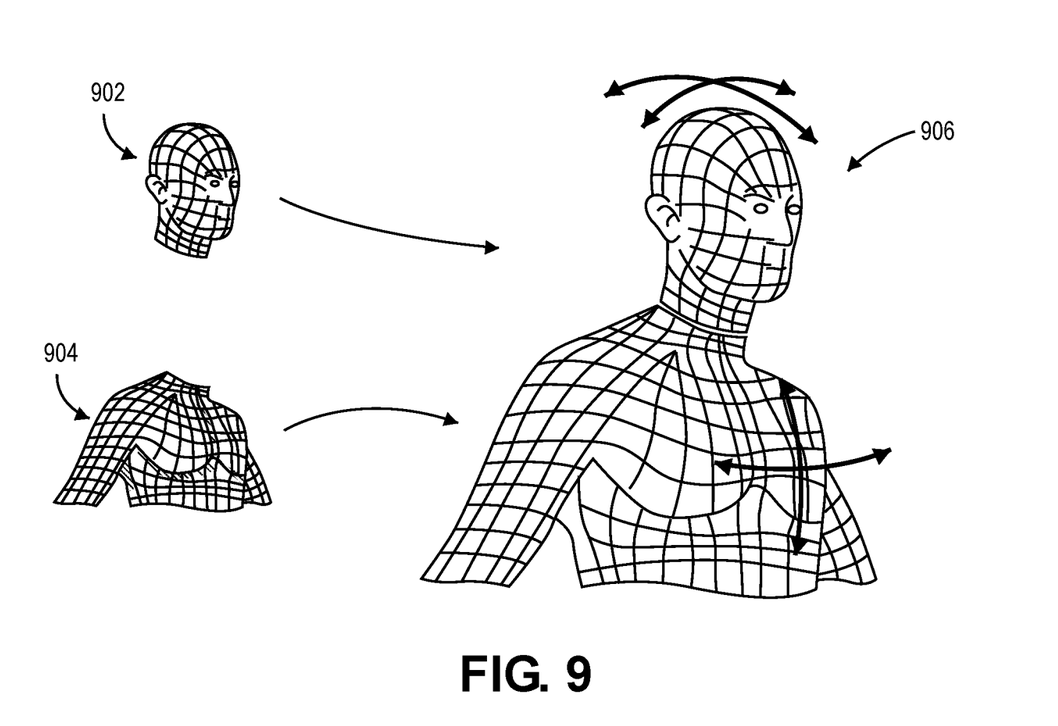
FIG. 9 is a pictorial view of a head above torso mesh generation used to simulate a head-related transfer function for various combinations of head-to-source and head-to-torso orientations, in accordance with an embodiment.

Referring to FIG. 9, a pictorial view of a head above torso mesh generation used to simulate a head-related transfer function for various combinations of head-to-source and head-to-torso orientations is shown in accordance with an embodiment. In an embodiment, numerically simulated HRTFs are calculated for different relative orientations between head 102 and torso 106. It has been shown that the HRTF of an individual can be accurately simulated using numerical acoustic simulation codes, such as the finite element method or boundary element method of calculating HRTFs. A mesh of head 102 (head mesh 902) and a mesh of torso 106 (torso mesh 904) can be generated using known imaging techniques, such as 3D optical scanning. Head mesh 902 and torso mesh 904 can be combined into a head-and-torso mesh 906 having head 102 positioned and oriented in a respective manner relative to torso 106. Head mesh 902 and torso mesh 904, which are imaged separately, can be stitched together into a variety of different head-and-torso meshes 906. Each head-and-torso mesh 906 can represent a particular head-to-torso orientation 314. Accordingly, each head-and-torso mesh 906 can correspond to a particular HRTF simulation.

In an embodiment, the set of HRTFs corresponding to respective head-to-torso geometries can be simulated for different head-to-sound source orientations. More particularly, the family of head-to-torso geometries can be used to calculate HRTFs for the full set of head-to-source and head-to-torso orientations. It will be appreciated that each HRTF is frequency dependent, i.e., each HRTF is dependent on a frequency band of the virtual sound emitted by sound source 100. Accordingly, the simulated HRTFs can populate HRTF database 350 such that HRTF database 350 (FIG. 3) includes several numerically simulated HRTFs 352 for respective combinations of head-to-source orientations 312 and head-to-torso orientations 314. Each HRTF in HRTF database 350 can correspond to a permutation of a yaw angle between sound source 100 and head 102, a pitch angle between sound source 100 and head 102, a distance between sound source 100 and head 102, a yaw angle between head 102 and torso 106, a pitch angle between head 102 and torso 106, a distance between head 102 and torso 106, and a frequency of the emitted virtual sound. Each HRTF 352 is therefore appropriate for simulating the soundscape of a user having a particular pose.

The media system can select, from HRTF database 350, the appropriate HRTF based on head-to-source orientation 312 and head-to-torso orientation 314, which is measured or estimated as described above. Accordingly, an appropriate binaural audio filter based on the selected HRTF can be applied to audio input signal 332 to generate audio output signal 334. Audio output signal 334 can be a binaural signal that is sent to head mounted device 306, e.g., headphones. At operation 208, audio output signal 334 is played by the media system to recreate spatial audio. For example, the processor provides a left audio output signal and a right audio output signal (generated by binaural filters, respectively) to drive respective speaker drivers of a headset (headphones), which recreates the spatial sound emitted by the sound source 100 as would be heard by the user 104 if the user were present in the sound field of the sound source 100. The spatial audio can include sound source 100 at the relative position and location from user 104. More particularly, the spatial audio reproduction can include sounds emitted to user 104 by sound source 100, and can accurately reproduce the effects of the head orientation and the torso orientation on the perceived sounds.

Storing the multitude of HRTFs that represent every possible head-to-source and head-to-torso orientations can be memory intensive. In an aspect, the memory demands associated with storing a large number of HRTFs can be addressed by storing a smaller set of HRTFs, along with accompanying correction filters that compensate for related head-to-torso orientations. More particularly, for each HRTF corresponding to a particular head-to-source orientation, the HRTF database 350 may include one or more correction filters that compensate for audio effects of respective head-to-torso orientations at the particular head-to-source orientation. By way of example, an HRTF corresponding to a source being directly in front of a listener may be associated with a first correction filter that adjusts for a first relative position between the head and the torso, a second correction filter that adjusts for a second relative position between the head and the torso, etc. To accurately simulate the soundscape, a binaural audio filter based on the nominal HRTF for a given head-to-source orientation can be selected. The binaural audio filter may be combined with the particular correction filter for the head-to-torso orientation that exists concurrently with the head-to-source orientation. The combined audio filter may then be applied to the audio input signal to generate the audio output signal that simulates the soundscape.

Figure 10:
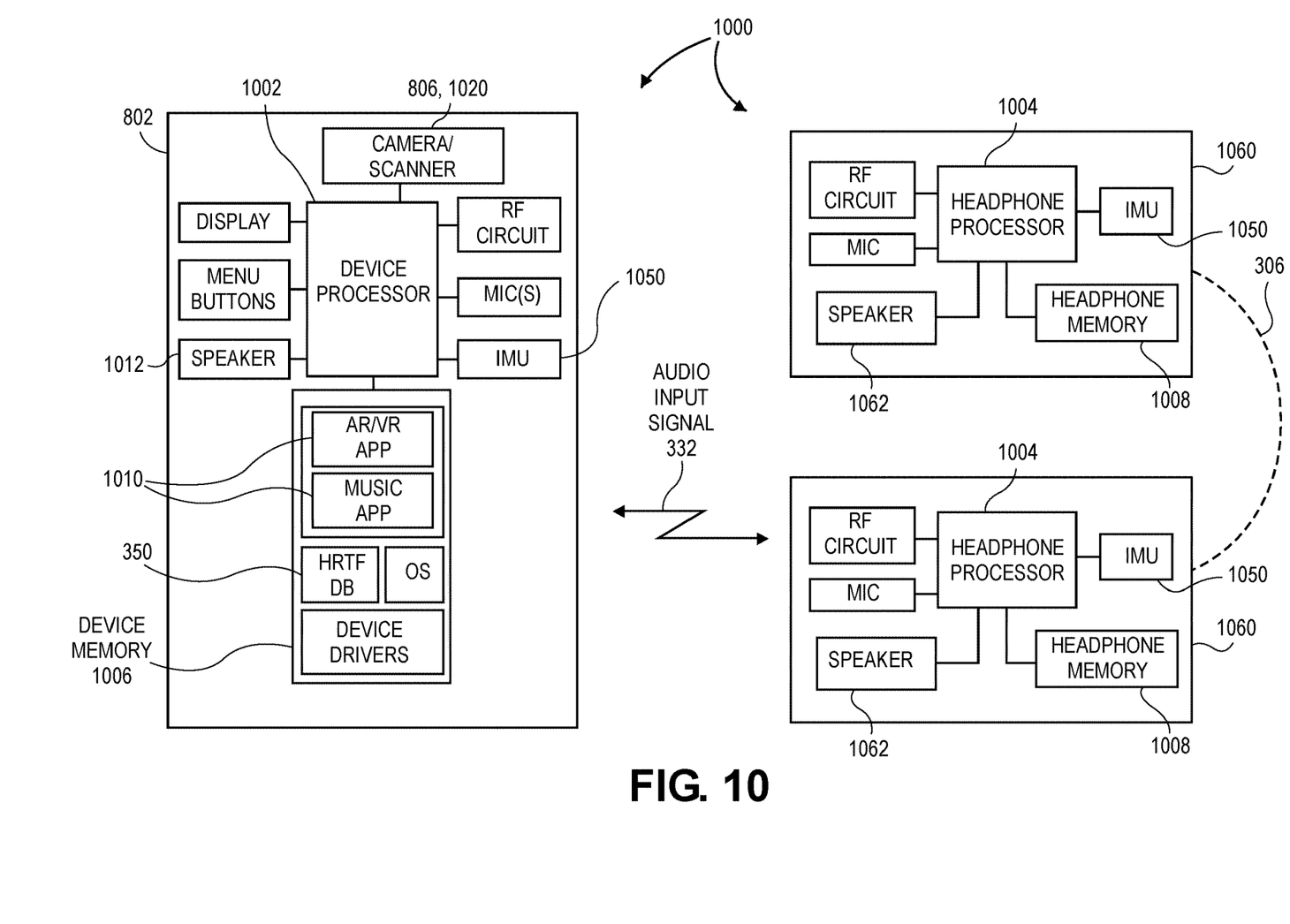
FIG. 10 is a block diagram of a media system, in accordance with an embodiment.

Referring to FIG. 10, a block diagram of a media system is shown in accordance with an embodiment. A media system 1000 can include mobile device 802, which can be any of several types of portable devices or apparatuses with circuitry suited to specific functionality. Similarly, media system 1000 can include head mounted device 306, e.g., headphones, which can be any of several types of head-mounted audio devices or apparatuses with circuitry suited to specific functionality. Accordingly, the diagrammed circuitry is provided by way of example and not limitation.

Mobile device 802 may include one or more device processors 1002 to execute instructions to carry out the different functions and capabilities described above. Similarly, head mounted device 306 can include one or more headphones processors 1004 to execute instructions to carry out the different functions and capabilities described above. Instructions executed by device processor(s) 1002 and/or headphones processor(s) 1004 may be retrieved from respective memory, e.g., a device memory 1006 or a headphones memory 1008, which may include a non-transitory computer readable medium. For example, the instructions may be in the form of an operating system program having device drivers and/or an audio rendering engine for rendering music playback, binaural audio playback, etc., according to the methods described above. Device processor(s) 1002 and/or headphones processor(s) 1004 can retrieve data from respective memory for various uses.

In an aspect, device processor(s) 1004 can access and retrieve audio data stored in device memory 1006. Audio data may be an audio input signal 332 provided by one or more audio sources 1010. Audio sources 1010 can include phone and/or music playback functions controlled by telephony or audio application programs that run on top of the operating system. In an aspect, an audio application program can generate predetermined audio signals, e.g. soundscape signals, to be played by device speaker 1012 and/or headphones speaker 1062. Similarly, audio sources 1010 can include an augmented reality (AR) or virtual reality (VR) application program that runs on top of the operating system. In an aspect, an AR application program can generate a spatial input signal 332 to be output to headphones 306. For example, mobile device 802 and headphones 306 can communicate signals wirelessly via respective RF circuitry, or through a wired connection. Accordingly, headphones 306 can play spatial audio to user 104 based on spatial input signal 332 from audio sources 1010.

In an aspect, device memory 1006 stores audio filter data for use by device processor(s) 1002. For example, device memory 1006 can store HRTF database 350. HRTF database 350 can include numerically simulated HRTFs 352 corresponding to respective combinations of head-to-source orientation 312 and head-to-torso orientation 314 (and being frequency dependent). The dataset of HRTFs encapsulate the fundamentals of spatial hearing of user 104. Accordingly, device processor(s) 1002 can use HRTF database 350 to select an appropriate HRTF and apply the HRTF to audio input signal 332 to generate audio output signal 334 corresponding to the sound source 100, head 102, and torso 106 relative positions and orientations.

Device memory 1006 can also store data generated by an imaging system of mobile device 802. For example, an optical scanner such as a structured light scanner (or RGB camera) 1020 of mobile device 802 can capture images of user 104 while mobile device 802 is moved around head 102, and the images can be stored in device memory 1006. Images may be accessed and processed by device processor(s) 1002 to determine the head mesh 902 and/or torso mesh 904. The meshes can be stitched together in different relative orientations to simulate the head-and-torso meshes 906 that are used to simulate HRTFs for user 104.

In an aspect, mobile device 802 can include other sensors to facilitate head or torso tracking of user 104. For example, forward facing camera 806 of mobile device 802 can capture torso orientation data 420. Similarly, an inertial measurement unit (IMU) 1050 can be used to generate torso orientation data 420 when mobile device 802 is worn by user 104.

To perform the various functions, device processor(s) 1002 may directly or indirectly implement control loops and receive input signals from, and/or provide output signals to, other electronic components. For example, device processor(s) 1002 may receive input signals from microphone(s) or menu buttons of mobile device 802, including through input selections of user interface elements displayed on a display.

Headphones 306 can include one or more earphone 1060, e.g., a pair of earphones connected by a headband, a neck cord, or another physical connector (shown in phantom). In an aspect, headphones 306 are insert-type earphones. As described above, headphones 306 may include one or more headphones processors 1004 to execute instructions and to carry out the different functions and capabilities described above. The instructions may be in the form of an operating system program having device drivers and/or an audio rendering engine for rendering music playback, binaural audio playback, etc., according to the methods described above.

In an aspect, headphones memory 1008 stores audio data, e.g., a cached portion of audio input signal 332 received from mobile device 802. Headphones memory 1008 can similarly store music or AR/VR applications, like device memory 1006. In an embodiment, headphones memory 1008 store HRTF database 350. Headphones processor 1004 can receive audio input signal 332 from mobile device 802 or headphones memory 1008, select the appropriate HRTF 352 based on the head-to-source and head-to-torso orientation information, and apply the selected HRTF filter to the cached portion when providing binaural playback to user 104 through headphones 306. In an aspect, all functionality of system 100 can be performed by the components in headphones 306.

In an aspect, headphones 306 can include sensors to facilitate head tracking and/or torso tracking of user 104. For example, headphones 306 can incorporate a camera, a depth sensor, or an IMU 1050 to generate data corresponding to a relative orientation between headphones 306 and a gravity vector or a relative orientation between headphones 306 and torso 106. This head tracker and torso tracker data can be provided to headphones processor(s) 1004 to determine and/or estimate head-to-source and head-to-torso orientation, as described above.

Each earphone 1060 of headphones 306 can include an earphone speaker 1062 to output a sound to user 104. More particularly, earphone speakers 1062 can receive audio output signal 334 from device processor 1002 and/or headphones processor 1004. The audio output signal 334 can drive earphone speakers 1062 to generate and emit spatialized sound toward the ears of user 104, and therefore, to recreate spatial audio to user 104.

As described above, one aspect of the present technology is the gathering and use of data available from various sources to provide spatial audio. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., audiograms, vital signs measurements, medication information, exercise information), date of birth, or any other identifying or personal information.

The present disclosure recognizes that the use of such personal information data, in the present technology, can be used to the benefit of users. For example, the personal information data can be used to provide spatial audio. Accordingly, use of such personal information data enables users to have an improved audio listening experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of spatial audio, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data. For example, the enrollment process can be performed based on non-personal information data or a bare minimum amount of personal information, such as a height or a weight of the user, other non-personal information available to the device processors, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    determining a head-to-source orientation between a head of a user and a sound source based on head orientation data generated by a head tracking device;
    determining a head-to-torso orientation between the head and a torso of the user, wherein the head-to-torso orientation is based on the head orientation data and torso orientation data, and wherein the torso orientation data is derived from the head orientation data based on movements of the torso that accompany movements of the head;
    applying a binaural audio filter to an audio input signal to generate an audio output signal, wherein the binaural audio filter is based on a head-related transfer function (HRTF) corresponding to the head-to-source orientation and the head-to-torso orientation; and
    playing the audio output signal to recreate spatial audio of sounds emitted to the user by the sound source.

2. The method of claim 1, wherein determining the torso orientation data includes determining that the torso moves toward alignment with the head when the head orientation data meets a head movement condition.

3. The method of claim 2, wherein the head movement condition includes movement of the head from a first head orientation to a second head orientation and resting the head at the second orientation for a predetermined period of time.

4. The method of claim 2, wherein the head movement condition includes movement of the head by a predetermined angle.

5. The method of claim 4, wherein the predetermined angle includes one or more of a yaw angle, a pitch angle, or a roll angle.

6. The method of claim 2, wherein the head movement condition includes movement of the head matching a pattern of head movement of one or more other users.

7. The method of claim 1, wherein determining the head-to-torso orientation is based on contextual information about one or more of a current state of the user or a current use of the head tracking device.

8. The method of claim 7, wherein the contextual information indicates that the user is ambulatory such that the head-to-torso orientation includes the head relative to a vertically-oriented torso.

9. The method of claim 7, wherein the contextual information indicates that the head tracking device is being used to play audio content of a movie such that the head-to-torso orientation includes the head aligned to the torso.

10. The method of claim 1 further comprising selecting the HRTF from an HRTF database, wherein the HRTF database includes a plurality of numerically simulated HRTFs for respective combinations of head-to-source orientations and head-to-torso orientations.

11. The method of claim 1, wherein the audio input signal represents a sound being produced by the sound source.

12. A media system, comprising:
    one or more processors configured to:
        determine a head-to-source orientation between a head of a user and a sound source based on head orientation data generated by a head tracking device,
        determine a head-to-torso orientation between the head and a torso of the user, wherein the head-to-torso orientation is based on the head orientation data and torso orientation data, and wherein the torso orientation data is derived from the head orientation data based on movements of the torso that accompany movements of the head, and apply a binaural audio filter to an audio input signal to generate an audio output signal, wherein the binaural audio filter is based on a head-related transfer function (HRTF) corresponding to the head-to-source orientation and the head-to-torso orientation; and one or more speakers configured to play the audio output signal to recreate spatial audio of sounds emitted to the user by the sound source.

13. The media system of claim 12, wherein the head tracking device is a head mounted device.

14. The media system of claim 12, wherein determining the torso orientation data includes determining that the torso moves toward alignment with the head when the head orientation data meets a head movement condition.

15. The media system of claim 12, wherein determining the head-to-torso orientation is based on contextual information about one or more of a current state of the user or a current use of the head tracking device.

16. The media system of claim 12 further comprising a memory storing an HRTF database including a plurality of numerically simulated HRTFs for respective combinations of head-to-source orientations and head-to-torso orientations;

wherein the one or more processors are further configured to select the HRTF from the HRTF database.

17. The media system of claim 12, wherein the audio input signal represents a sound being produced by the sound source.

18. A non-transitory computer readable medium containing instructions, which when executed by one or more processors of a media system, cause the media system to perform a method comprising:

determining a head-to-source orientation between a head of a user and a sound source based on head orientation data generated by a head tracking device;

determining a head-to-torso orientation between the head and a torso of the user, wherein the head-to-torso orientation is based on the head orientation data and torso orientation data, and wherein the torso orientation data is derived from the head orientation data based on movements of the torso that accompany movements of the head;

applying a binaural audio filter to an audio input signal to generate an audio output signal, wherein the binaural audio filter is based on a head-related transfer function (HRTF) corresponding to the head-to-source orientation and the head-to-torso orientation; and playing the audio output signal to recreate spatial audio of sounds emitted to the user by the sound source.

19. The non-transitory computer readable medium of claim 18, wherein determining the torso orientation data includes determining that the torso moves toward alignment with the head when the head orientation data meets a head movement condition.

20. The non-transitory computer readable medium of claim 19, wherein the head movement condition includes movement of the head from a first head orientation to a second head orientation and resting the head at the second orientation for a predetermined period of time.

21. The non-transitory computer readable medium of claim 19, wherein the head movement condition includes movement of the head by a predetermined angle.

22. The non-transitory computer readable medium of claim 18, wherein determining the head-to-torso orientation is based on contextual information about one or more of a current state of the user or a current use of the head tracking device.

23. The non-transitory computer readable medium of claim 18, wherein the audio input signal represents a sound being produced by the sound source.

\* \* \* \* \*